(12) United States Patent
Lee et al.

(10) Patent No.: US 9,027,492 B2
(45) Date of Patent: May 12, 2015

(54) DRILLSHIP HAVING VORTEX SUPPRESION BLOCK WITH RECESSED FLOW STABILIZING SECTION IN MOON POOL

(75) Inventors: Sang-Bong Lee, Busan (KR); Kang-Hoon Lee, Ulsan (KR); You-Won Ann, Ulsan (KR); Hyung-Kwan Kim, Ulsan (KR); Seok-Ho Chung, Ulsan (KR); Yong-Kwan Chung, Ulsan (KR); Min-Jae Kwon, Ulsan (KR)

(73) Assignee: Hyundai Heavy Industries Co., Ltd., Ulsan (KR)

( * ) Notice: Subject to any disclaimer, the term of this patent is extended or adjusted under 35 U.S.C. 154(b) by 0 days.

(21) Appl. No.: 14/241,906

(22) PCT Filed: Jul. 20, 2012

(86) PCT No.: PCT/KR2012/005792
§ 371 (c)(1),
(2), (4) Date: Feb. 28, 2014

(87) PCT Pub. No.: WO2014/014149
PCT Pub. Date: Jan. 23, 2014

(65) Prior Publication Data
US 2014/0202371 A1  Jul. 24, 2014

(51) Int. Cl.
*B63B 9/08* (2006.01)
*B63B 1/32* (2006.01)
*B63B 35/44* (2006.01)
*B63B 3/14* (2006.01)

(52) U.S. Cl.
CPC . *B63B 1/32* (2013.01); *B63B 35/44* (2013.01); *B63B 3/14* (2013.01); *B63B 2003/147* (2013.01); *Y02T 70/12* (2013.01)

(58) Field of Classification Search
USPC ............................. 114/65 R, 121, 264; 441/3
IPC .............................................. B63B 22/02,39/06
See application file for complete search history.

(56) References Cited

U.S. PATENT DOCUMENTS

| 3,987,910 | A   | 10/1976 | Brunato |        |
|-----------|-----|---------|---------|--------|
| 7,918,174 | B2* | 4/2011  | Ahn et al. | 114/65 R |
| 8,327,783 | B2* | 12/2012 | Son et al. | 114/65 R |
| 8,770,124 | B2* | 7/2014  | Shim et al. | 114/65 R |

FOREIGN PATENT DOCUMENTS

| KR | 10-2000-0025585 A | 5/2000 |
| KR | 10-2001-0032980 A | 4/2001 |
| KR | 20-0435392 Y1 | 1/2007 |
| KR | 10-2007-0109824 A | 11/2007 |
| KR | 10-2009-0023891 A | 3/2009 |
| KR | 10-2009-0058187 A | 6/2009 |

(Continued)

*Primary Examiner* — Stephen Avila
(74) *Attorney, Agent, or Firm* — Rabin & Berdo, P.C.

(57) ABSTRACT

Disclosed is a drillship having a vortex suppression block with a recessed flow stabilizing part in a moon pool. The flow stabilizing section is formed so that a bottom of the vortex suppression block that protrudes from a bottom of a hull toward a stern in the moon pool is recessed in an upward direction of the hull to stabilize a flow in the moon pool and reduce a variation in resistance of the drillship. The flow stabilizing section (30) is formed by partly recessing the bottom of the vortex suppression block toward an upper portion of the hull. The drillship having this configuration provides resistance performance improvement and flow stabilization of the drillship.

8 Claims, 7 Drawing Sheets

(56) References Cited

FOREIGN PATENT DOCUMENTS

| KR | 10-2010-0028307 A | 3/2010 |
|----|-------------------|--------|
| KR | 10-2010-0047123 A | 5/2010 |
| KR | 10-2011-009086 A | 1/2011 |
| KR | 10-2011-0061872 A | 6/2011 |
| KR | 10-2012-0104828 A | 9/2012 |

* cited by examiner

DRILLSHIP HAVING VORTEX SUPPRESION BLOCK WITH RECESSED FLOW STABILIZING SECTION IN MOON POOL

TECHNICAL FIELD

The present invention relates, in general, to, a drillship having a vortex suppression block with a recessed flow stabilizing section in a moon pool installed in the bottom of the hull, and more particularly, to a drillship having a vortex suppression block with a recessed flow stabilizing section, in which a moon pool is subjected to a change in shape on a bow side so as to control streamlines and vortexes separated by an edge of the moon pool which is located on the bow side, thereby reducing a variation in resistance applied to the moon pool, stabilizing a free surface in the moon pool, and causing the vortex suppression block to only minimally protrude from the bottom of the hull.

BACKGROUND ART

With the development of industries all over the world, the use of petroleum and a natural gas has increased, and thus concern for the development of minor marginal oil fields or deepwater oil fields, which have been ignored because of low economical efficiency, has been rising.

Drillships equipped with drilling facilities for developing such oil fields have been developed in various forms, along with the development of seabed mining techniques.

In oil drilling methods used on the sea, in the past, rig ships or fixed platforms for only seabed drilling were mainly used for seabed drilling while being at anchor at one point on the sea. In recent years, drillships equipped with high-tech drilling equipment and manufactured in the same form as general ships so as to be able to be propelled by their own engines have been developed and used for seabed drilling.

As for structures of the above-mentioned drillships, a moon pool vertically passes through the center of a hull to move down a drilling pipe to a seabed. In such a moon pool, during navigation of the drillship, a very strong turbulent flow may be generated. The turbulent flow is generated by an interaction between a vortex separated at an end of the moon pool which is located on a bow side and a free surface. The turbulent flow makes the free surface unstable, and increases a time variation in resistance, thereby degrading the resistance performance of the drillship.

FIG. 1 shows a side view for describing a shape of a conventional general moon pool installed in a drillship. An external flow S10 introduced into a moon pool 50 of the hull of the drillship moves from a bow side 10 to a stern side 11. In this case, a vortex suppression block 3 protrudes from the bottom of the moon pool 50 which is located on the bow side toward the stern side in order to suppress a vortex V10 generated by the external flow (main flow). The flow is separated at an edge 10a of the vortex suppression block 3, and the vortex V10 is generated due to instability of a shear layer.

Due to the flow, the vortex bumps against an edge 11a of the moon pool 50 which is located on the stern side, and thereby a high-pressure turbulent flow is generated. As such, a time variation in resistance applied to the moon pool 50 increases. In addition, there is a problem in that a part S11 of the flow is introduced into the moon pool 50 by the vortex colliding with the edge located on the stern side, thereby disturbing a free surface W10 in the moon pool 50.

The related art for reducing the above-mentioned turbulent flow is shown in FIG. 2. FIG. 2 is a side cross-sectional view showing a shape of the moon pool having a flow stabilizing apparatus installed on a drillship. As shown in FIG. 2, an inclined protrusion 20 protrudes from the edge of the moon pool 50 which is located on the bow side, and is inclined toward the seabed. The inclined protrusion 20 is intended to control a vortex generated at an end of the inclined protrusion, and adjust a separation angle θ of an external flow S20 passing through the moon pool 50.

However, in the turbulent flow reducing structure described above, there are problems as follows. The inclined protrusion 20 that is additionally formed on the vortex suppression block 3 for suppressing the vortex at the edge of the bow side protrudes from the bottom of the hull toward the seabed. Thus, the inclined protrusion 20 may be restricted by depth of the seawater when the drillship is built. Further, the inclined protrusion 20 becomes too large when attempting performance improvement while keeping the separation angle constant. In addition, the separation angle increases, and thus an average value of resistances applied to the drillship increases when attempting performance improvement while keeping a height of the inclined protrusion 20 constant.

In addition, the related art for suppressing the flow in the moon pool is disclosed in Korean Patent Application No. 10-2007-37729 (entitled Anti-Sloshing Device in Moon Pool). This flow suppressing apparatus installed in the moon pool distributes and absorbs flow energy of the seawater generated inside the moon pool, suppresses a sloshing phenomenon and an overflowing phenomenon generated inside the moon pool, and delays a vortex generated inside the moon pool. Thereby, the speed of a ship can be improved. A major configuration thereof has a plurality of moon pool plates that are vertically installed at a bow side, a stern side, and both sides of the ship that correspond to inner walls of the moon pool; and a bottom block of the moon pool which is attached to a lower end side of the bow side of the inner wall of the moon pool in a central direction of the moon pool, and formed so as to maintain a level equivalent to a bottom surface of the ship. It is characterized that the moon pool plates and the bottom block of the moon pool have a protruding width that does not interfere with a maximum working area, a plurality of ends of an upper side among the moon pool plates are installed lower than a free surface of the seawater when the ship is located at a working location, and a plurality of ends of a lower side among the moon pool plates are installed lower than the free surface of the seawater when the ship is sailing.

Such a conventional technique has an advantage in that the apparatus reduces the flow introduced into the inside of the moon pool, and thereby the free surface in the moon pool can be stabilized because the apparatus distributes and absorbs the flow energy after it has been introduced into the moon pool.

However, there are disadvantages in that there is a reduced ability to control the flow and the vortex separated from the edge of the bow and thereby reduce pressure variability caused by collision of the streamlines and the vortex at the edge of the stern, because introduction of the external flow into the moon pool is not reduced. Additionally, installation of moon pool plates with an excessively complex configuration creates a problem in that weight and cost are increased.

In addition, still another preceding art for suppressing a flow in a moon pool is disclosed in Korean Patent Application No. 10-2008-87278 (entitled Moon Pool Having Anti-Flow Device). The moon pool having an anti-flow device separates a flow of the seawater to form a boundary layer for the purpose of a reduction in flow velocity or blocking of the running water introduced through a moon pool, and thereby performing a direct resisting function and an anti-flow function through friction, interference, and bubble generation among the flows of the running water. It is characterized that the seawater flow self-suppressing apparatus is installed in a singular or multistage structure, in which the seawater flow self-suppressing apparatus includes a seawater flow change structure that is installed at a vertical wall near a waterline of the moon pool, and is made of angled steel so as to change a flow direction of the seawater to be horizontally disposed along the vertical wall, and a running water flow separation structure that is formed in a funnel shape so as to separate the flow of the running water from a lower portion of the seawater flow change structure to be horizontally disposed along the vertical wall, and thereby forming the seawater boundary layer.

Such related art has an advantage in that the device separates the flow of the seawater to form the boundary layer for the purpose of the reduction of the flow velocity or the blocking of the running water introduced through the moon pool, and thereby a self-blocking ability of the seawater anti-flow device can primarily be used, and a friction force by the separated flow can be used.

However, there are disadvantages in that there is a reduced ability to control the flow and the vortex separated from the edge of the bow and thus reduce pressure variability caused by collision of the streamlines and the vortex at the edge of the stern, because introduction of the external flow into the moon pool is not reduced, and a problem in that an increase in weight and an increase in manufacturing cost of the drillship occur due to installation of the seawater flow change structure that is horizontally disposed along the vertical wall with an excessively complex configuration.

In addition, as techniques for suppressing a flow in a moon pool of a drillship, there are a plurality of preceding arts for reducing the flow in the moon pool such as Korean Utility Model Registration Application No. 20-2006-24344 (floating restraint structure in the moon-pool of ship) and Korean Patent Application No. 10-2007-124862 (flowing reduction structure of moon-pool structure of drill ship), but most of them relate to an additional apparatus configuration inside the moon pool. Most of them have a disadvantage in that there is a reduced ability to control the flow and the vortex separated from the edge of the bow and thus reduce the pressure variability caused by the collision of the streamlines and the vortex at the edge of the stern, because introduction of the external flow into the moon pool is not reduced, and a problem in that an increase in weight and an increase in manufacturing cost of the drillship occur due to addition of an additional complex apparatus configuration in the moon pool.

DISCLOSURE

Technical Problem

Accordingly, the present invention has been made keeping in mind the above problems occurring in the prior art, and an object of the present invention is to provide a drillship that includes a flow stabilizing section formed to recess a bottom of a vortex suppression block, which protrudes from a bottom of the drillship toward a stern in a moon pool, toward an upper portion of a hull in order to stabilize a flow in the moon pool and reduce a change amount in resistance of the drillship.

Technical Solution

In order to accomplish the above object, the present invention provides a drillship that includes a vortex suppression block having a recessed flow stabilizing section formed in a moon pool, the drillship including: a flow stabilizing section that is formed by partly recessing a bottom of the vortex suppression block toward an upper portion of the drillship.

In an exemplary embodiment of the present invention, the flow stabilizing section may include a flow introduction part that is formed to have an upward inclination with the approach to a stern side so as to prevent an external flow from being separated; a flow equilibrium part that is formed to be parallel to or have a predetermined angle with respect to a bottom of the hull so as to maintain the flow introduced through the flow introduction part; and a flow separation part that is formed to have a downward inclination with the approach to the stern side so as to cause the flow passing through the flow equilibrium part to be separated.

In an exemplary embodiment of the present invention, the drillship may further include: a flow acceleration part that is installed below the flow equilibrium part and the flow separation part so that the flow passing through the flow equilibrium part is accelerated while the flow is moving to the flow separation part.

In an exemplary embodiment of the present invention, the flow introduction part may be formed to be inclined with respect to the bottom of the hull at an angle less than or equal to 30°.

In an exemplary embodiment of the present invention, a shape of a transition between the flow introduction part and the bottom of the hull may be formed to have a curvature R.

In an exemplary embodiment of the present invention, the flow equilibrium part formed to have the predetermined angle may be formed to have an angle between −10° and +10° with respect to the bottom of the hull.

In an exemplary embodiment of the present invention, a transition between the flow equilibrium part and the flow introduction part may be formed to have a curvature R.

In an exemplary embodiment of the present invention, the flow separation part may have any one selected from a linear shape, a curved shape, or a combination of the linear shape and the curved shape.

In an exemplary embodiment of the present invention, the flow acceleration part may be installed at a position and an angle adjusted so that a cross-sectional area between the flow equilibrium part and the flow acceleration part is larger than a cross-sectional area between the flow separation part and the flow acceleration part.

Advantageous Effects

As described above, the present invention has advantages as follows. The flow and the vortex separated at the edge of the bow side of the moon pool formed in the drillship are controlled to reduce the pressure variability caused by the collision of the streamlines and the vortex at the edge of the stern side. Thereby, it is possible to improve the resistance performance of the drillship, reduce the flow introduced from the edge of the stern into the moon pool, and stabilize the free surface in the moon pool.

Further, the bottom of the vortex suppression block, which is formed on the bow side of the moon pool is recessed in an upward direction. Thereby, the apparatus minimally protrudes from the bottom of the hull and thus economics of shipbuilding can be improved. Due to these advantages, the present invention is greatly expected for industrial applications.

MODE FOR INVENTION

Hereinafter, configurations and functions of embodiments of the present invention will be described in detail with reference to the accompanying drawings. Furthermore, in the following description of the present invention, details of well-known functions and structures incorporated herein may be omitted to avoid unnecessarily obscuring the subject matter of the present invention.

Figure 3:
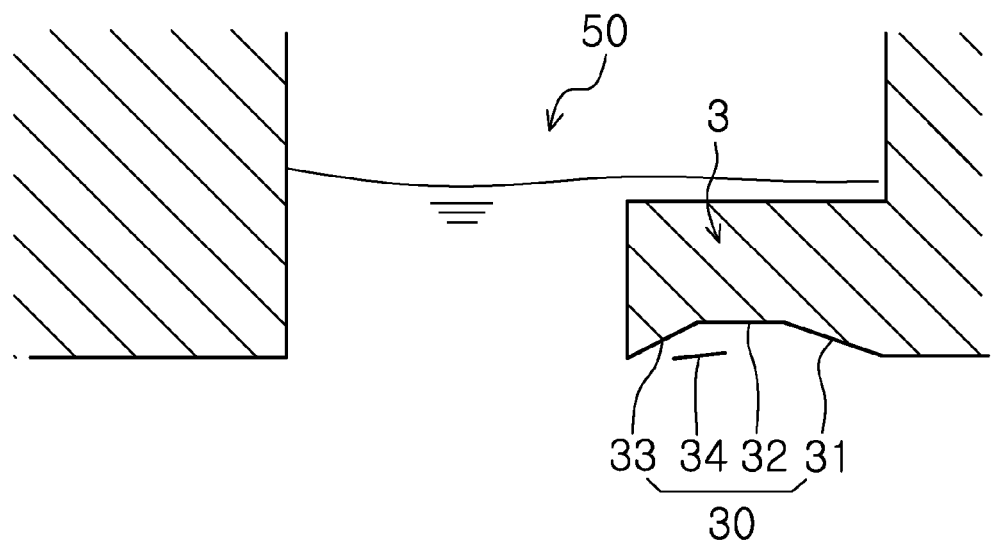
FIG. 3 is a side view of a moon pool that includes a flow stabilizing section according to one embodiment of the present invention.

FIG. 3 is a side view of a moon pool that includes a flow stabilizing section according to one embodiment of the present invention. As shown in FIG. 3, to suppress a vortex generated by an external flow S10 introduced into a moon pool 50 that is vertically formed in the hull of the drillship, a vortex suppression block 3 protrudes from a bow side toward a stern side of the bottom of the moon pool, and a recessed flow stabilizing section 30 is formed by recessing the bottom of the vortex suppression block 3 toward an upper portion of the hull.

The recessed flow stabilizing section 30 that is formed by recessing the bottom of the vortex suppression block 3 includes: a flow introduction part 31 that is formed to have an upward inclination with the approach to the stern side to prevent the external flow from being separated; a flow equilibrium part 32 that is formed to be parallel to or have a predetermined angle with respect to the bottom of the vortex suppression block 3 so as to maintain the external flow introduced through the flow introduction part; and a flow separation part 33 that is formed to have a downward inclination with the approach to the stern side to cause the external flow passing through the flow equilibrium part to be separated.

In addition, the present invention may further include a flow acceleration part 34 that is installed below the flow equilibrium part and the flow separation part at a predetermined interval so that an external flow S70 passing through the flow equilibrium part is changed into an accelerated flow S71 while moving to the flow separation part. Although not shown in the drawing, at least both ends or the whole of the flow acceleration part is configured so that a plurality of brackets or support members are connected to the bottom of the vortex suppression block. In other words, the flow acceleration section is configured so that a plate-like member is connected to the bottom of the vortex suppression block by the brackets or the support members.

Hereinafter, each component constituting the flow stabilizing section will be described in more detail.

Figure 4A:
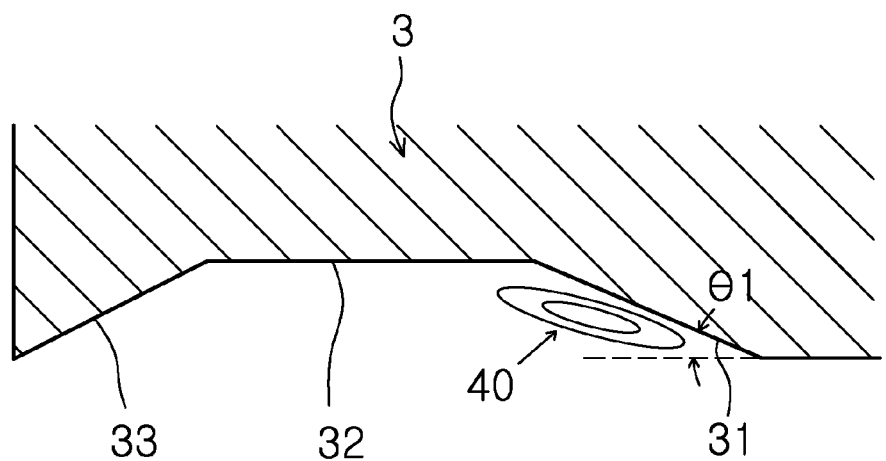
FIG. 4a is a side view showing a structure of a flow introduction part according to an embodiment of the present invention.

FIG. 4a is a side view showing a structure of a flow introduction part according to an embodiment of the present invention. As shown, the flow introduction part 31 recessed to form an entry of the flow stabilizing section 30 is inclined with respect to the bottom of the vortex suppression block at a predetermined angle θ1. Here, since the external flow introduced from the bottom of the hull should not be separated to generate a recirculation zone 40, the angle θ1 is maintained at an angle greater than 0° and less than or equal to 30°.

Here, the reason for which the recirculation zone should not be generated results from two important issues.

First, when the recirculation zone is generated, the external flow introduced from the outside cannot enter the recessed structure along the flow introduction part, and thus the recessed structure does not perform a normal function.

Second, when the recirculation zone is generated, pressure is decreased in the recirculation zone, and resistance applied to the hull increases, that is, resistance performance of the hull is degraded.

Figure 4B:
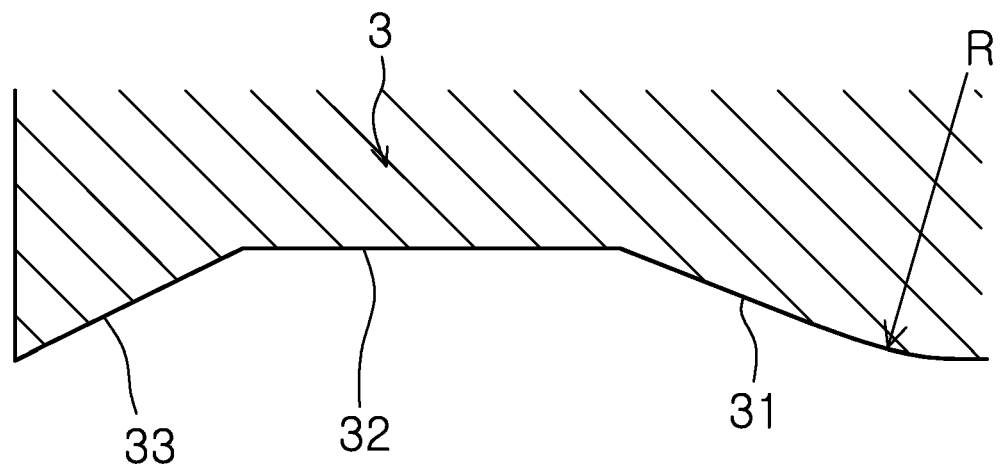
FIG. 4b is a side view showing a structure of a flow introduction part according to another embodiment of the present invention.

In addition, FIG. 4b is a side view showing a structure of a flow introduction part according to another embodiment of the present invention. As shown, to prevent flow separation and effectively introduce the flow, a transition between the flow introduction part and the bottom of the hull may be formed in a curved shape R.

This is because a change in flow caused by an angle between the bottom of the hull and the flow introduction part becomes weaker.

In other words, when a sharp change in streamline is caused by an edge and the like, a sharp pressure gradient occurs. Such a sharp pressure gradient increases pressure resistance applied to the hull. Thereby, this results in degradation in the resistance performance of the drillship. Therefore, the transition is preferably designed in the curved shape so as to minimize the sharp change in streamline and the resulting sharp pressure gradient.

Figure 5A:
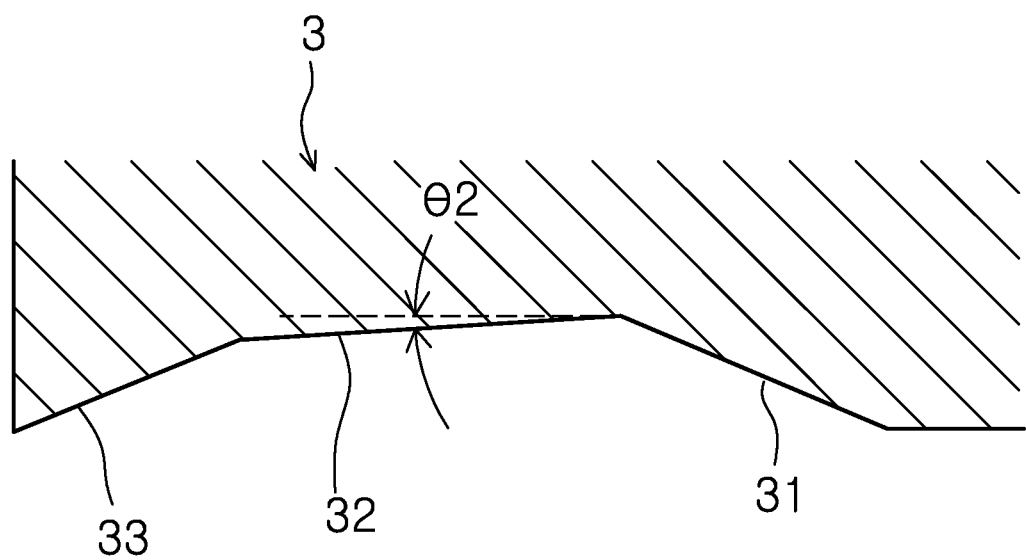
FIG. 5a is a side view showing a structure of a flow equilibrium part according to one embodiment of the present invention.

FIG. 5a is a side view showing a structure of a flow equilibrium part according to one embodiment of the present invention. As shown, the flow equilibrium part 32 of the flow stabilizing section 30 is preferably formed to be parallel to the bottom of the hull. However, to increase flow efficiency of the flow, the flow equilibrium part 32 may have an angle θ2 between −10° and +10° with respect to the bottom of the hull.

Specifically, since the flow introduction part has a specific angle with respect to the bottom of the hull, the flow introduced from the flow introduction part has a pressure gradient and a velocity gradient to a certain extent. Thus, when the flow having the pressure gradient and the velocity gradient is directly introduced into the flow separation part, the effect of suppressing the vortex may not be produced as desired.

Therefore, the flow equilibrium part functions to minimize such velocity and pressure gradients. However, since the pressure and velocity gradients generated from the flow introduction part are affected by a characteristic of the flow introduced from an upstream of the flow introduction part as well as a geometric angle of the flow introduction part, the angle of the flow equilibrium part is determined in consideration of both factors. In other words, since the flow equilibrium part functions to adjust the flow passing through the flow introduction part, a range between −10° and +10° is sufficient for the angle of the flow equilibrium part. When the angle is out of this range, the velocity gradient and the pressure gradient are generated from the flow equilibrium part, which leads to a high possibility of adverse effects occurring. As such, this range is the most preferable.

Figure 5B:
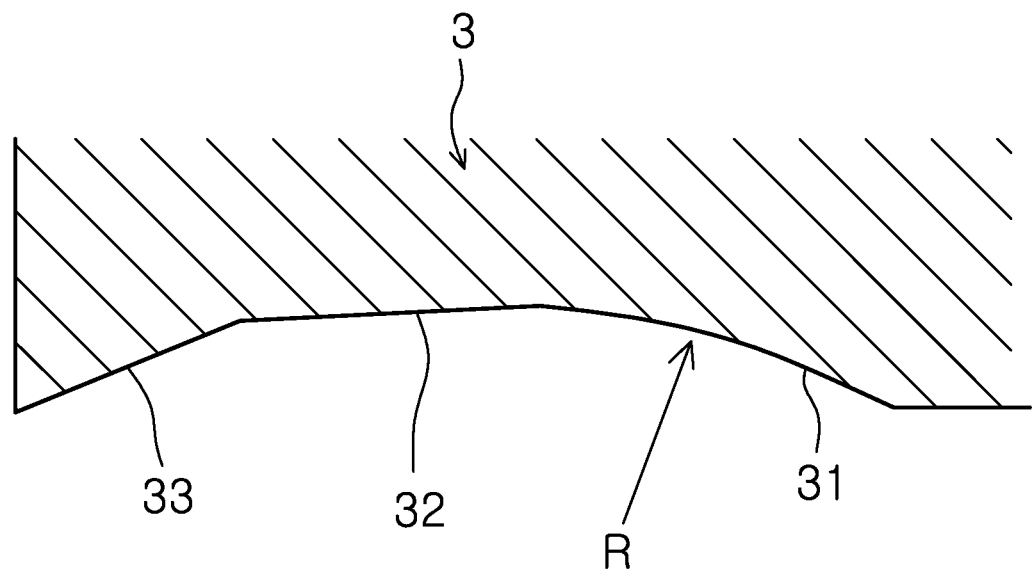
FIG. 5b is a side view showing a structure of a flow equilibrium part according to another embodiment of the present invention.

FIG. 5b is a side view showing a structure of a flow equilibrium part according to another embodiment of the present invention. As shown, a transition between the flow equilibrium part 32 and the flow introduction part 31 may be formed to have a curvature R for an efficient flow.

This is because a change in flow caused by the angle formed between the flow equilibrium part and the flow introduction part occurs gently. In other words, as described above, this is to minimize the abrupt change in the streamlines caused by the edge to reduce the pressure resistance.

Figure 6A:
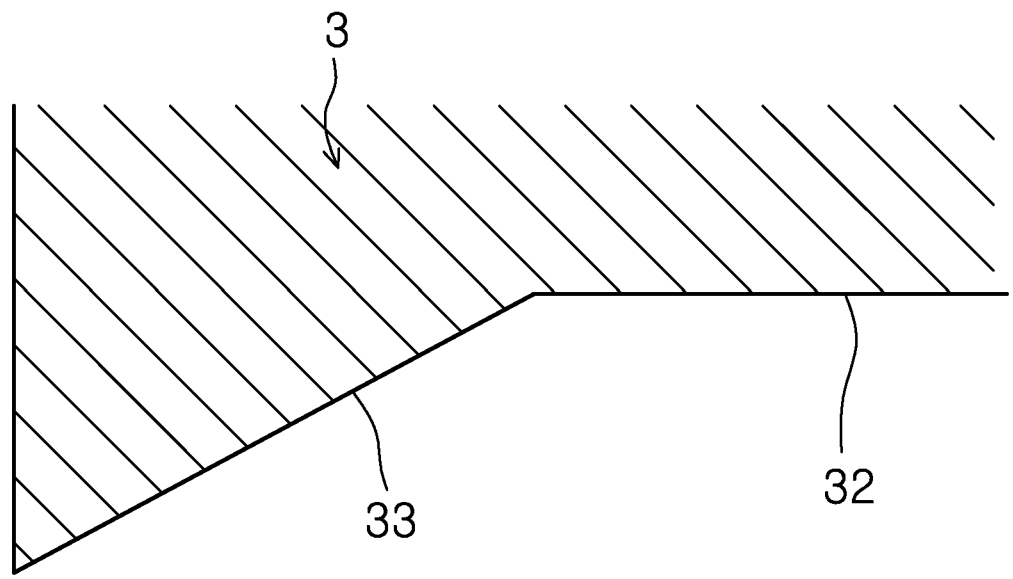
FIG. 6a is a side view showing a structure of a flow separation part according to one embodiment of the present invention.
Figure 6B:
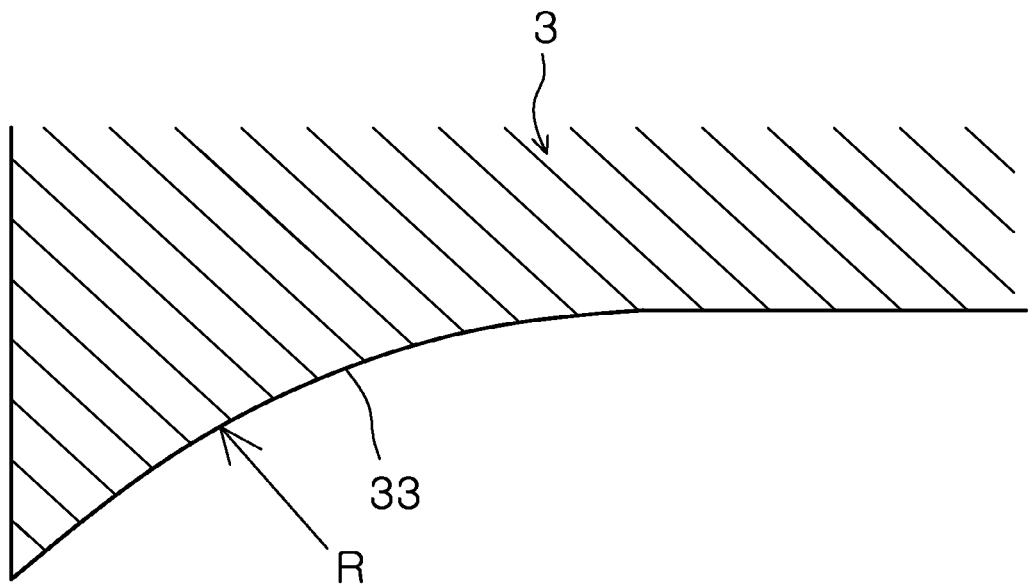
FIG. 6b is a side view showing a structure of a flow separation part according to another embodiment of the present invention.
Figure 6C:
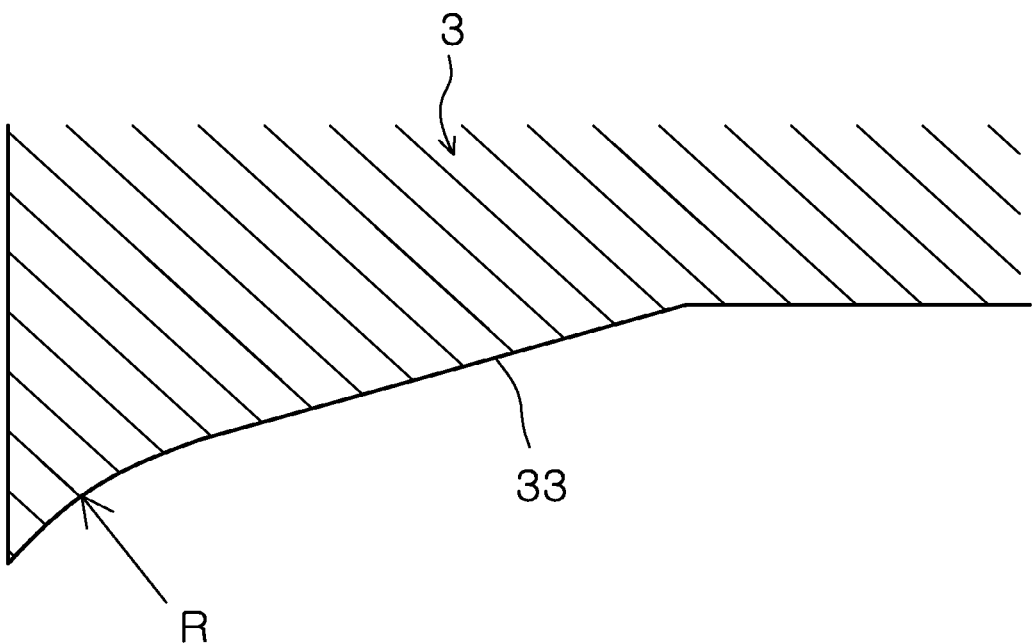
FIG. 6c is a side view showing a structure of a flow separation part according to still another embodiment of the present invention.

FIGS. 6a to 6c are side views showing a structure of a flow separation part according to various embodiments of the present invention. As shown, the flow separation part 33 may be formed in a linear shape as shown in FIG. 6a, in a curved shape as shown in FIG. 6b, or in a combination of the linear shape and the curved shape as shown in FIG. 6c.

Among the three shapes, in the curved shape shown in FIG. 6b, the change in flow caused by the angle formed between the flow equilibrium part and the flow separation part may occur gently, and in the combination shown in FIG. 6c, a flow is accelerated at an end of the flow separation part, and flow separation efficiency is further improved.

Figure 7:
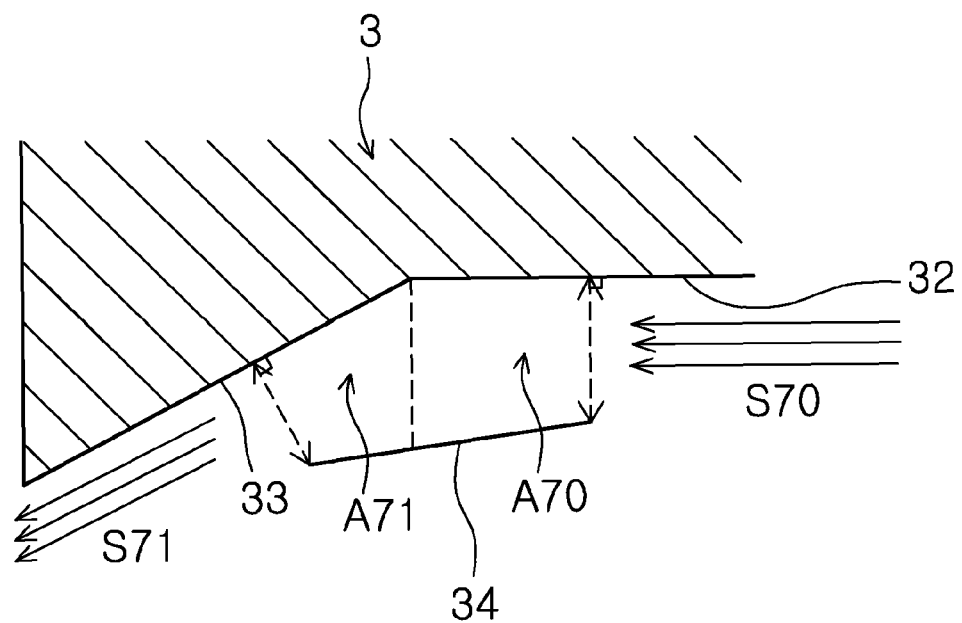
FIG. 7 is a side view showing a structure of a flow acceleration part according to one embodiment of the present invention.

FIG. 7 is a side view showing a structure of a flow acceleration part according to one embodiment of the present invention. As shown, the flow acceleration part 34 is installed away from the bottom of the hull and guides the flow. To allow a flow S70 passing through the flow equilibrium part 32 to be accelerated to a flow S71 when the flow S70 is moving to the flow separation part 32, a position and an angle of the flow acceleration part 34 are adjusted. In other words, a cross-sectional area A70 between the flow equilibrium part 32 and the flow acceleration part 34 is set to be larger than a cross-sectional area A71 between the flow separation part 33 and the flow acceleration part 34.

For supplementary description, the fact that the flow is accelerated when the area through which the flow passes is reduced has already been known as a matter of common sense, and may be considered to be the same context as Bernoulli's principle. In the present invention, due to the recessed structure in which the bottom of the hull is recessed upward, the resultant space is secured. As such, the flow acceleration part is installed in the space so as to allow the flow to be further accelerated. To secure objectivity of an angle and a position at which the flow acceleration part serving as the guide is installed, the space is expressed as an area.

Figure 8:
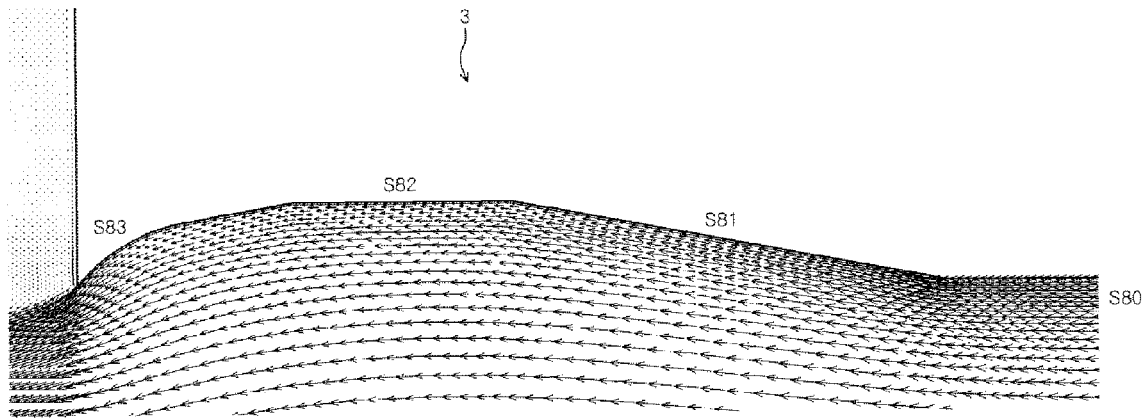
FIG. 8 is a side flow diagram for describing flow characteristics of the moon pool according to embodiments of the present.

FIG. 8 is a side flow diagram for describing a flow characteristic of the moon pool in the embodiments of FIGS. 4a to 7. As shown, it can be seen that a flow S80 introduced into the moon pool is introduced inward (a flow S81) into the flow introduction part forming an entry of the flow stabilizing section according to the present invention, passes through the flow equilibrium part (a flow S82), and undergoes separation at the flow separation part (a flow S83).

Figure 1:
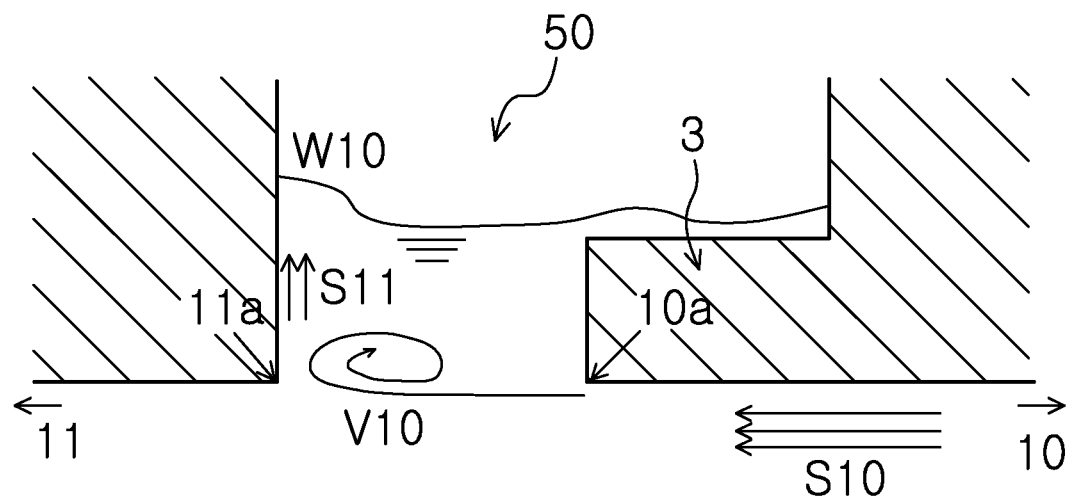
FIG. 1 is a side cross-sectional view showing a shape of a general moon pool installed on a drillship according to a conventional embodiment.
Figure 2:
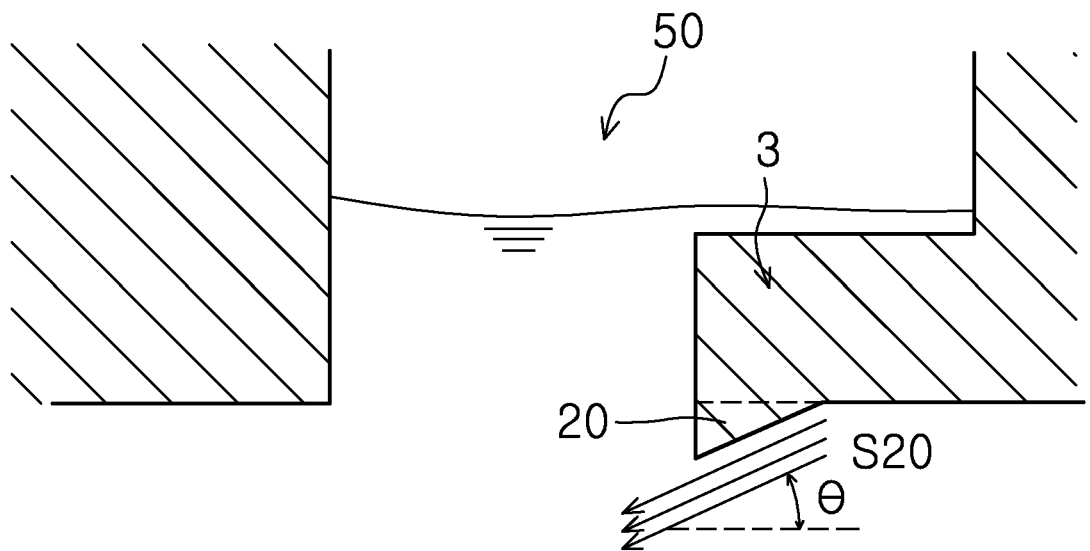
FIG. 2 is a side cross-sectional view showing a shape of a moon pool having a flow stabilizing apparatus installed on a drillship according to another conventional embodiment.

In addition, Table 1 below shows an average value and a standard deviation of the resistances applied to the conventional moon pool shown in FIG. 1, and an average value and a standard deviation of the resistances applied to the flow stabilizing section of the present invention. In other words, Table 1 shows values obtained by performing a numerical analysis on the resistances caused by a turbulent flow in the moon pool. It can be seen that, when the flow stabilizing section according to the present invention is provided for the vortex suppression block, the average and the standard deviation of the resistances in the moon pool are reduced by 37% and 88% compared to those of the conventional moon pool.

TABLE 1

| Resistance | Conventional moon pool | Moon pool of the present invention |
|---|---|---|
| Average value | 1 | 0.633 |
| Standard deviation | 1 | 0.119 |

(In order to compare the moon pool of the present invention with the conventional moon pool, the average value and the standard deviation of the resistances of the moon pool of the present invention are divided by those of the conventional moon pool, and are made dimensionless)

Figure 9:
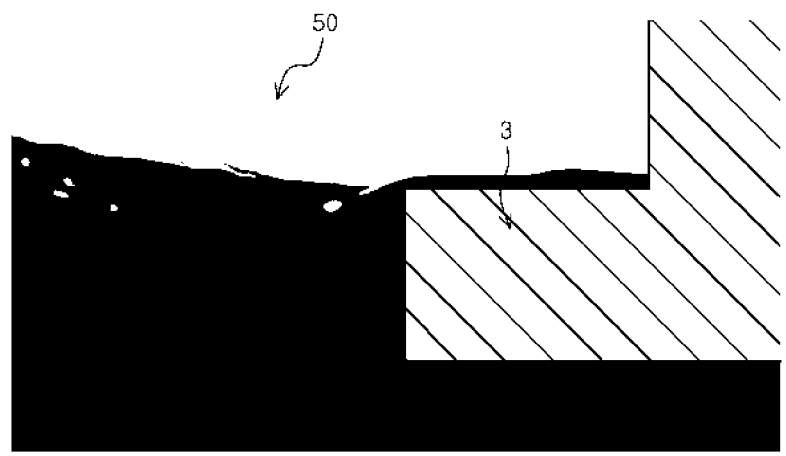
FIGS. 9(a) and 9(b) are instantaneous flow field comparison view obtained by comparing free surfaces in a conventional moon pool and a moon pool according to an embodiment of the present invention.
Figure 9:
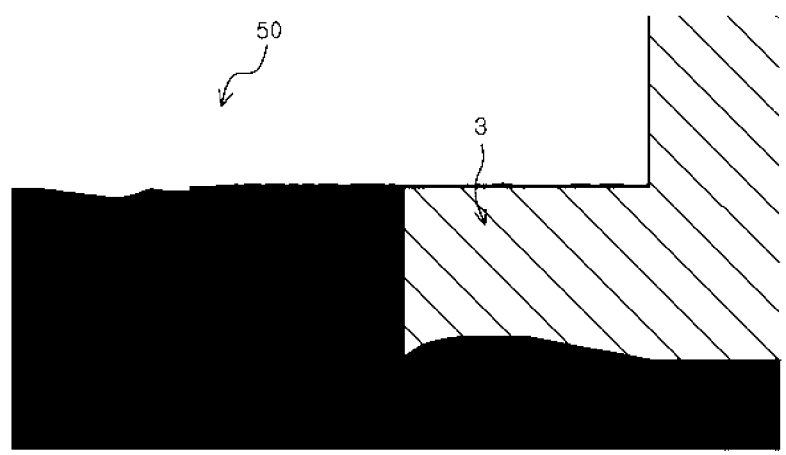

On the other hand, FIG. 9a shows an instantaneous flow field of a free surface in the conventional moon pool, and FIG. 9b shows an instantaneous flow field of a free surface in the moon pool according to the embodiment of the present invention, which is used for comparison with the conventional moon pool. As can be seen from the heights of the free surfaces, the flow in the moon pool of the embodiment of the present invention is stabilized.

The present invention is not limited to the aforementioned specific preferred embodiments. It will be apparent to those skilled in the art that various modifications, additions and substitutions are possible, without departing from the scope and spirit of the invention as disclosed in the accompanying claims. These modifications and alterations fall within the technical scope of the present invention.

DESCRIPTION OF THE REFERENCE NUMERALS IN THE DRAWINGS (3): Vortex suppression block
(30): Flow stabilizing section
(31): Flow introduction part
(32): Flow equilibrium part
(33): Flow separation part
(34): Flow acceleration part
(40): Recirculation zone
(50): Moon pool
(S10): External flow
(S11): Flow introduced from edge of stern of moon pool into moon pool
(V10): Vortex
(W10): Free surface
($\theta$): Angle of flow separated by flow stabilizing apparatus
($\theta1$): Angle formed between flow introduction part and bottom of drillship
($\theta2$): Angle formed between flow equilibrium part and bottom of drillship (A70): Cross-sectional area through which flow passing between flow equilibrium part and flow acceleration part passes (A71): Cross-sectional area through which flow passing between flow separation part and flow acceleration part passes

What is claimed is:

1. A drillship having a vortex suppression block in a moon pool, comprising:
   a recessed flow stabilizing section formed in a bottom of the vortex suppression block in which the vortex suppression block is partly recessed toward an upper portion of the vortex suppression block, the recessed flow stabilizing section including
      a flow introduction part having an upward inclination with approaching to a stern side and preventing an external flow from being separated,
      a flow equilibrium part formed in parallel or with a predetermined angle to a bottom of a hull and maintaining a flow introduced through the flow introduction part, and
      a flow separation part having a downward inclination with approaching to the stern side and separating the flow passing through the flow equilibrium part; and
   a flow acceleration part installed below the flow equilibrium part and the flow separation part so that the flow passing through the flow equilibrium part is accelerated when moving to the flow separation part.

2. The drillship of claim 1, wherein the flow introduction part is formed to be inclined with respect to the bottom of the hull at an angle greater than 0° and less than or equal to 30°.

3. The drillship of claim 1, wherein a transition between the flow introduction part and the bottom of the hull is formed to have a curvature (R).

4. The drillship of claim 1, wherein the flow equilibrium part is formed to have an angle between −10° and +10° with respect to the bottom of the hull.

5. The drillship of claim 1, wherein a transition between the flow equilibrium part and the flow introduction part is formed to have a curvature (R).

6. The drillship of claim 1, wherein the flow separation part has a linear shape, a curved shape, or a combination of the linear shape and the curved shape.

7. The drillship of claim 1, wherein the flow acceleration part is installed such that a space between the flow equilibrium part and the flow acceleration part is larger than a space between the flow separation part and the flow acceleration part.

8. The drillship of claim 2, wherein a transition between the flow introduction part and the bottom of the hull is formed to have a curvature (R).

* * * * *